Oct. 4, 1960  L. KULL ET AL  2,954,852
ISOCHRONOUS GOVERNOR FOR MOTORS AND THE LIKE
Filed March 28, 1957  3 Sheets-Sheet 1
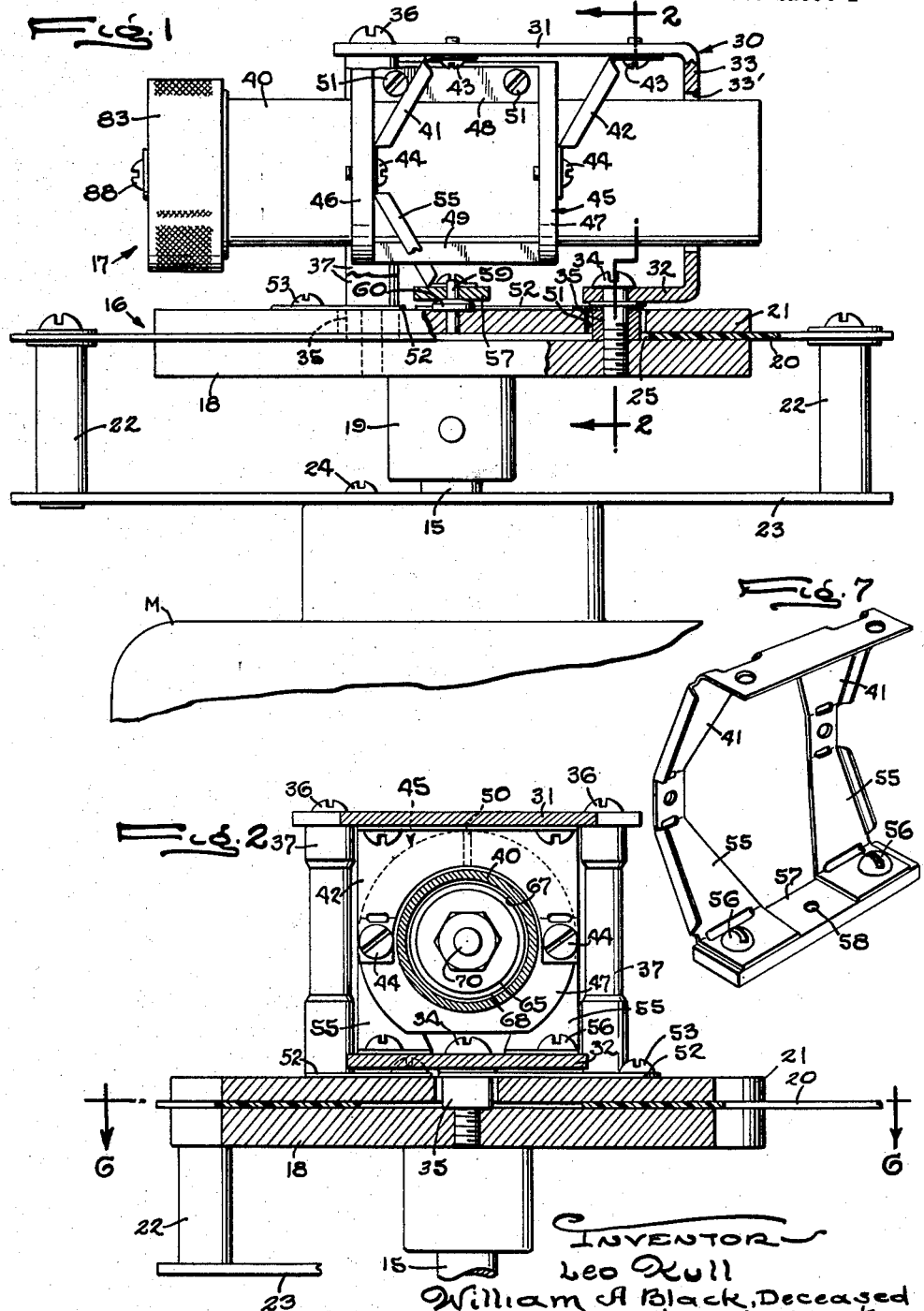
INVENTORS
Leo Kull
William A Black, Deceased
Marion Bennett Black, Executrix
ATTORNEY

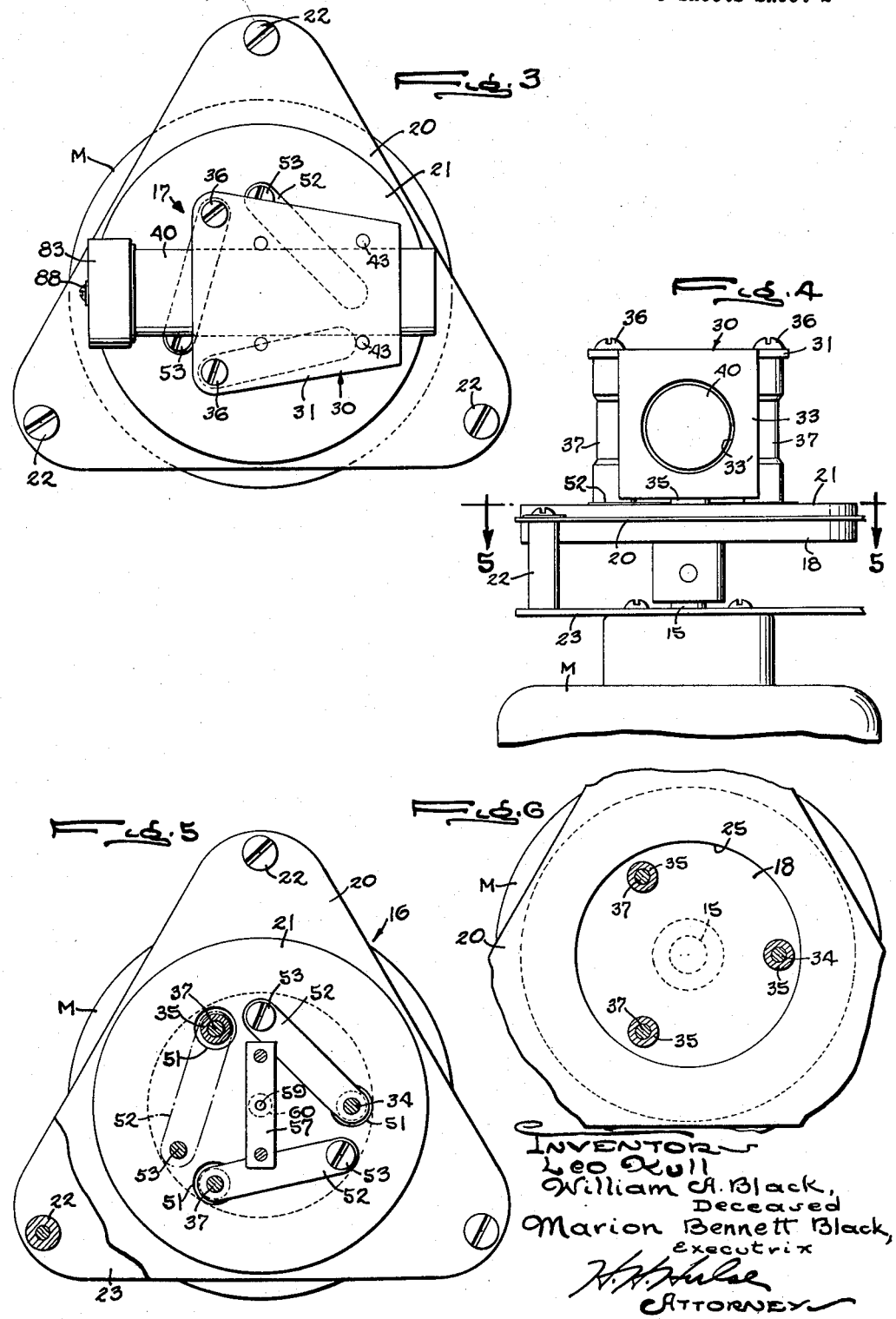

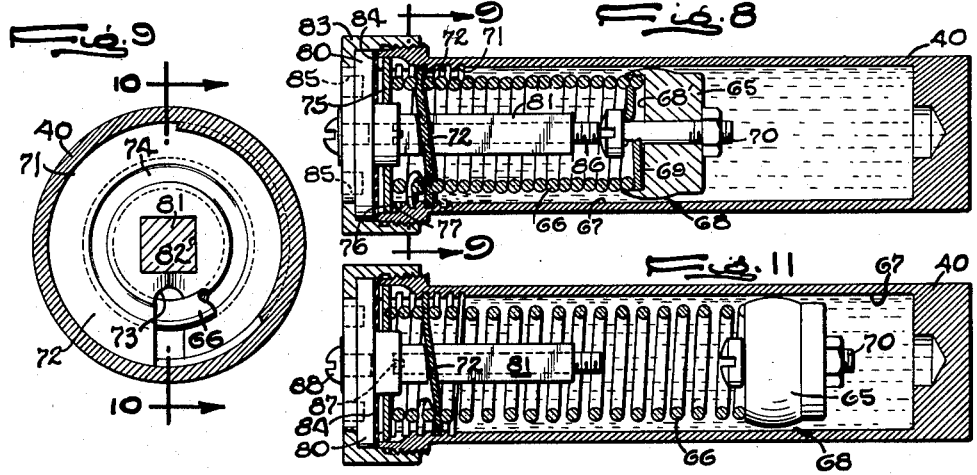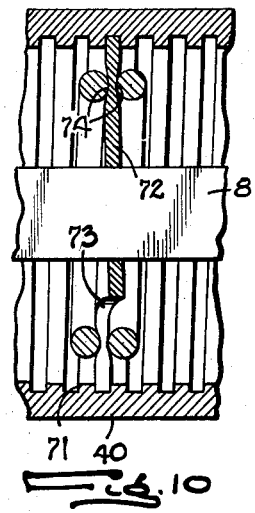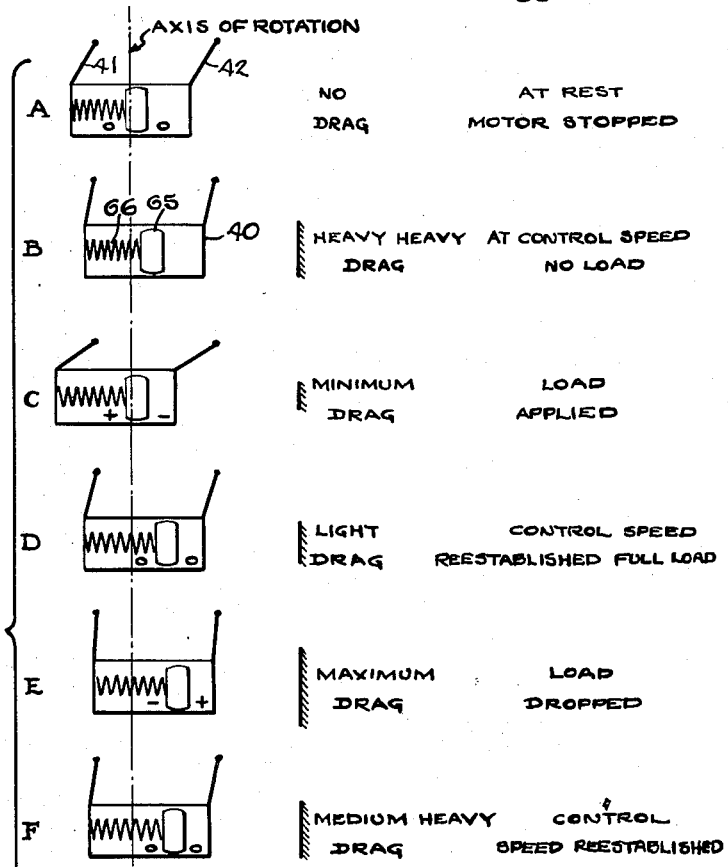

United States Patent Office 2,954,852
Patented Oct. 4, 1960

2,954,852

ISOCHRONOUS GOVERNOR FOR MOTORS AND THE LIKE

Lee Kull, Jersey City, and William A. Black, deceased, late of Montclair, N.J., by Marion Bennett Black, executrix, Montclair, N.J., assignors to General Time Corporation, New York, N.Y., a corporation of Delaware Filed Mar. 28, 1957, Ser. No. 653,724

17 Claims. (Cl. 188—187)

The invention relates to centrifugal governors for motors and the like and it is more particularly concerned with an improved isochronous governor for maintaining the speed of a motor substantially constant under varying power and load conditions.

The improved governor finds particular utility in the fractional horsepower motor field in which the need for a practical isochronous governor has become critical in recent years, due in part to military requirements. While such governors have been devised for use with large motors where complicated and expensive reset and auxiliary mechanisms are justified, no satisfactory governor of that type has been devised for smaller motors. With governors of the type heretofore available, the required stability has been obtainable only by imposing offset or speed droop characteristics of at least several percent between no load and full load operation. Heretofore no practical way has been found to coordinate the mutually antagonistic requirements of sensitivity and stability as measured by the ability of the governor to maintain substantially constant speed under all load conditions without objectionable hunting.

One object of the invention is to overcome the difficulties above described and provide a simple practical centrifugal governor which is both extremely sensitive and highly stable and which has a negligible offset or speed droop under varying load and power conditions.

Another object is to provide a governor of the above general character which responds very quickly to changes in speed and in which the speed responsive element is automatically reset in a manner effectively eliminating hunting without introducing any offset or speed droop into the governor operation.

A more specific object is to provide a governor in which the transmission of force from the speed responsive element to the element which takes the corrective action is effected through a spring or other resilient means while the speed remains substantially constant and at the set point but in which the force transmission is effected through nonresilient means such as a substantially confined body of liquid when a change in speed occurs.

Other objects and advantages of the invention will become apparent from the following detailed description of the preferred embodiment illustrated in the accompanying drawings in which:

Figure 1 is a side view of a governor embodying the features of the invention shown as mounted on the shaft of an electric motor.

Fig. 2 is a sectional view taken in a vertical plane substantially on the line 2—2 of Fig. 1.

Fig. 3 is an elevational view of the governor as viewed from the end of the motor.

Fig. 4 is a side elevational view of the governor shown in Fig. 1.

Fig. 5 is a sectional view taken in a horizontal plane substantially on the line 5—5 of Fig. 4.

Fig. 6 is a fragmentary sectional view taken on a plane substantially on the line 6—6 of Fig. 2.

Fig. 7 is a perspective view of the toggle spring comprising a part of the mounting for the speed responsive means of the governor.

Fig. 8 is a longitudinal sectional view through the assembly constituting the speed responsive means of the governor showing the parts at rest.

Fig. 9 is a sectional view taken in a plane substantially on the line 9—9 of Fig. 8.

Fig. 10 is a fragmentary sectional view taken in a plane substantially on the line 10—10 of Fig. 9.

Fig. 11 is a sectional view similar to Fig. 8 showing the positioning of the elements of the speed responsive means under normal operating conditions with the motor speed at the set point.

Fig. 12 is a diagram illustrating the action of the speed responsive means under different operating conditions.

While a preferred form of the invention has been shown and will be described in detail herein, it is not intended that the detailed character of the disclosure should limit the invention to such particulars. On the contrary, the intention is to cover all modifications, adaptations and alternative constructions falling within the spirit and scope of the invention as it is more broadly and generally characterized in the appended claims.

For purposes of illustration the invention has been shown in a form particularly suitable for direct association with the shaft of a motor whose speed is to be controlled. The motor M shown is an electric motor with a shaft 15 projecting at one end for connection with the driven device or mechanism (not shown) and at the other end for connection with the governor.

The improved governor is of the type adapted to apply a variable frictional drag on the rotation of the shaft as required to maintain it at a predetermined control speed. The drag is applied by a friction brake indicated generally at 16 under control of speed responsive means 17 mounted on and rotatable with the shaft 15. The speed responsive means is mounted on a base 18 herein shown as a metal disc having a hub 19 adapted to fit over the end of the motor shaft 15 and nonrotatably secured thereby by a pin or other suitable keying means.

The brake 16 in its preferred form comprises a stationary brake element 20 and a movable brake element 21 assembled on and rotating with the governor supporting base 18. The brake element 20 as herein shown comprises a triangular plate of friction material such as pressed asbestos fibre or the like. It is rigidly supported adjacent and in parallel spaced relation to the outer face of the disc 18 by rigid posts 22 connecting the three corners of the element with the corresponding corners of a triangular supporting plate 23. The supporting plate is centrally apertured to accommodate the motor shaft 15 and it is rigidly secured to the motor frame as by screws 24.

As shown in Figs. 1, 2 and 5 the stationary brake element 20 is formed with a relatively large central aperture 25 to afford clearance for the mounting of the speed responsive means on the disc 18. Such mounting is effected through the medium of a bracket 30 having long and short legs 31 and 32 connected by an integral end member 33. A short leg 32 is secured to the disc 18 by a screw 34 with a cylindrical spacer 35 interposed between the bracket and the disc. The other leg 31 of the bracket is secured to the disc by screws 36 threaded into posts 37 which have their opposite end portions reduced in diameter and threaded for screw engagement with appropriately positioned holes in the disc 18. The reduced portions of the post are of sufficient length to accommodate the spacers 35. It may be noted that the brackets and securing means are shaped and dimensioned so that the bracket leg 31 is disposed parallel to the face of the disc 18 and thus perpendicular to the rotational axis of the shaft 15.

The speed responsive means 17, to be described in detail hereinafter, includes a carrier 40 in the form of an elongated cylinder. The carrier is supported on the bracket 30 with its longitudinal axis normal to the axis of the shaft 15 and for limiting movement in the direction of its longitudinal axis. Such support is provided by a pair of plate springs 41 and 42, each secured at one end to the leg 31 of the bracket as by screws 43. The springs are disposed so as to extend inwardly at an angle toward the supporting disc 18 and are secured at their other ends as by screws 44 to a clamp 45 adapted to grip and hold the carrier 40. As will be seen by reference to Figs. 2 and 7, springs 41 and 42 are recessed centrally to provide clearance for the carrier 40 when mounted in the clamp. The side portions or legs of the springs thus straddle the carrier and their connections with the clamp are in a plane coincident with the axis of the carrier. A clearance hole 33' is also provided in the end member 33 of the bracket to afford clearance for the carrier when assembled with the clamp as shown in Fig. 1.

As will be seen by reference to Figs. 1 and 2 of the drawings the clamp 45 comprises a pair of coaxially alined rings 46, 47 internally dimensioned to receive the carrier 40. These rings are rigidly connected as a unit by longitudinal ribs 48 and 49 which may be formed integrally with the rings. Preferably the ribs are spaced diametrically of the rings and one rib, in this instance, the rib 48, is split longitudinally as indicated at 50 (Fig. 2) to permit the rings to be sprung open to receive the carrier. The rings can then be contracted to rigidly clamp the carrier by means of clamping screws 51 arranged to draw the two sections of the rib 48 together. It will be evident that this mounting permits convenient adjustment of the carrier longitudinally to locate it accurately with respect to the rotational axis of the shaft 15.

The suspension of the carrier clamp 45 from the bracket 30 as above described permits limited movement of the carrier 40 transversely of the shaft upon application thereto of a force sufficient to overcome the resistance of the springs 41 and 42. Such movements are utilized to vary the pressure of the brake element 21 against the fixed brake element 20 to impose a variable friction drag on the rotation of the driving shaft 15. As will appear presently the action of the speed responsive means is such that the frictional drag is varied in a manner effective to maintain the shaft at a predetermined substantially constant speed under varying power and load conditions.

The shiftable brake element or shoe 21 as herein shown comprises a circular metal disc of the same diameter as disc 18. It is thus adapted to extend over a substantial area of the stationary brake element 20 when assembled with the other elements of the governor as shown in Fig. 1. To provide for this assembly, apertures 51 in the disc are located to fit over the spacers 35 provided with the screw 34 and posts 37. These apertures are dimensioned to afford sufficient clearance so that the disc can slide freely in an axial direction toward and from the stationary brake element 20 and yet is constrained to rotate with the base 18 and other governor elements mounted thereon.

In the particular governor shown the brake disc 21 is resiliently supported by three flat springs 52, each clamped at one end between the spacer 35 and an associated screw or post. As shown in Figs. 3 and 5 springs 52 are disposed in a generally triangular pattern and each has its free end rigidly secured to the brake disc as by a screw 53. This arrangement precludes application of objectional twisting force to the springs 52 and assists in maintaining substantially uniform pressure on the element 20 over the entire braking area of the disc 21. In practice the springs 52 are tensioned so as to hold the brake disc 21 with its face in very light contact with the adjacent face of the stationary element 21 so that a minimum drag is imposed on the rotation of the shaft 15 and governor assembly.

When the governor is in operation, that is, when the shaft 15 is rotating, the pressure of the disc 21 on the brake element 20 is adjusted or varied in accordance with the position of the weight 65 acting through the carrier 40. For this purpose the side portions or legs of the spring 41 are extended beyond their connections with the clamp 45 to form spring arms 55 inclined oppositely to the spring 41. The arms 55 are respectively anchored as by screws 56 to opposite ends of an elongated flat metal strip 57. Intermediate its ends the strip 57 is apertured as at 58 for the reception of a pin 59 rigid with and projecting from the brake disc 21 at its rotational axis. Preferably the pin is formed with a flange 60 intermediate its ends adapted to fit flush against the upper face of the brake disc and to define a bearing for the strip 57.

As shown in Fig. 7 the spring 41 and its arms 55 are fabricated from a single piece of spring material bent to a form which enables the spring and arms to function as a toggle with its respective elements anchored to the bracket 30 and the brake disc 21. Accordingly, any movement of the carrier 40 to the right as viewed in Fig. 1 tends to straighten the toggle elements and apply an axial thrust to the brake disc in a direction to increase the braking effect or frictional drag. Conversely, any movement of the carrier in any opposite direction relieves the thrust on the brake disc and decreases frictional drag. These variations in the frictional drag, of course, regulate the rotative speed of the shaft 15.

During operation of the governor, the frictional drag on the motor shaft is effected by mechanism enclosed within the carrier which, as stated heretofore, comprises a hollow cylindrical member. As shown in Figs. 8 and 11, the enclosed mechanism includes a weight 65 movable axially in the carrier and biased toward one end thereof toward a spring 66 connected between the carrier and the weight.

As previously explained the carrier is supported to rotate about an axis perpendicular to its longitudinal axis. The spring 66 is dimensioned and the other parts of the mechanism are proportioned so that the assembly is balanced with respect to the rotational axis when at rest. In such balanced condition, however, the weight 65 is positioned eccentric to the rotation of the axis so that centrifugal force developed in the rotation of the assembly tends to shift it outwardly of the axis (to the right as viewed in Fig. 8) against the opposing force exerted by the spring 66. The spring, of course, is selected to provide a deflection such that the weight will take up a position short of the end of the carrier when rotating at control speed. It will be evident that the opposing force required to balance the centrifugal force acting on the weight 65 will be transmitted to the carrier 40 in the same direction.

In accordance with the invention a fluid connection is provided between the weight 65 and the carrier 40 to constrain them to react as a unit to sudden changes in shaft speed. More particularly, the arrangement is such that the fluid affords a direct connection from the weight to the carrier in the face of sudden changes in speed but which is free of direct connection under steady state conditions, with gradual transition between the two conditions. To this end, the weight 65 is constructed in the form of a piston adapted to reciprocate in a cylinder 67 defined by the inner wall of the carrier 40. To provide the fluid connection, the cylinder is filled with a relatively viscous liquid such as oil which, of course, must be displaced from one end of the cylinder to the other as the piston reciprocates. To stabilize the governing action and insure quick initial response to speed changes followed by prompt resetting of the weight and carrier for isochronous operation, the cylinder ends are connected by a restricted passage for such displacement of the liquid. This restricted passage is preferably formed as a clearance opening 68 between the piston and the cylinder walls. In other words, the piston is dimensioned for a loose fit in the cylinder 67 and its outer surface is made convex or barrel-shaped as shown in Figs. 8 and 11 so that the flow rate through the passage is directly proportioned to the clearance. It may also be noted that the loose fit, coupled with the lubricating action of the liquid, reduces frictional resistance to piston movement to a minimum.

In practice sufficient clearance is provided between the piston 65 and the cylinder walls to permit the liquid to pass from one end of the cylinder to the other without imposing any substantial resistance to a slow movement of the piston. There is sufficient restriction, however, so that when a force is applied to the piston to move it quickly in either direction, such as a sudden increase or decrease in the speed of the motor shaft, pressure of the liquid ahead of the piston is increased substantially and pressure behind the piston is correspondingly decreased. In effect, the partially trapped liquid ahead of the piston acts momentarily as a nonresilient connection between the piston and the cylinder defining carrier 40. Accordingly, the suddenly applied force acting on the piston is transmitted substantially instantaneously to the carrier independently of the spring 66. The carrier operates instantaneously to actuate the brake mechanism and adjust the frictional drag on the motor shaft as required to reestablish control speed. Pressure in the cylinder ends is gradually equalized by a relative shifting of the piston and cylinder until a position of equilibrium is attained or, in other words, until the speed responsive means of the governor is reset for isochronous operation. The gradual repositioning of the weight and carrier following their corrective movement as a unit, that is, the slow resetting, eliminates or materially reduces hunting so that control speed of the shaft is quickly reestablished.

A governor embodying the features of the invention found eminently suitable for governing the speed of small motors, as, for example, on the order of one-twentieth horsepower, utilized the following elements:

Cylinder 67— inside diameter 0.656 in.
Weight 65— solid brass, maximum diameter 0.654 in., length 0.4 in.
Spring 66— inside diameter 0.437 in., length 1.25 in., elongation 1 in. under 13.8 lb. load.
Brake area— 3.928 sq. in.
Liquid— oil-viscosity in the range of 100 to 105 seconds (Saybolt), specific gravity 0.865.

It will be understood, of course, that the above data is simply intended to give a general idea of the relative dimensions of some of the more important parts of a governor of one particular size designed for use with a specific motor.

Referring more in detail to Figs. 8–11 of the drawings, piston 65 in its preferred form comprises a suitably shaped solid metal block of substantial weight having its inner end recessed as at 68' to provide a seat for the spring 66 which, in this instance, is a helically coiled spring. The spring is anchored to the piston by means of a retaining disc 69 having its marginal edge portion bent into helical configuration and slotted so that it can be inserted between adjacent coils of the spring. A headed bolt 70 anchors the retainer to the piston.

The invention provides novel means for anchoring the other end of the spring 66 to the carrier 40 affording convenient adjustment of the effective length of the spring. Such adjustment, of course, determines the control or set speed maintained by the governor. For this purpose the inner wall of the carrier is formed adjacent one end with a thread 71 having a pitch substantially the same as that of the spring 66. A metal disc 72 having its marginal edge portion suitably bent to travel in the thread 71 is notched in one edge to permit it to be inserted between adjacent coils of the spring. When thus inserted, the disc provides an anchorage point for the spring on the carrier. Preferably opposite sides of the disc are formed with annular grooves 74 to assist in retaining the disc and spring in centered or axially alined relation.

It will be evident that the disc 72 when turned on its axis will travel along the thread 71 in one direction or the other. To prevent rotation of the spring 66 with the disc, a retainer 75 is soldered or otherwise rigidly secured to the end of the spring. The retainer 75 has radially projecting ears 76 engageable in longitudinal slots 77 in the inner wall of the carrier. Accordingly, turning of the adjusting disc 72 acts to screw it along the spring as well as along the thread 71 and thus vary the number of effective turns or the spring length between the anchorage point and the piston 75. Due to the travel of the disc axially of the carrier, this adjustment merely changes the spring rate without changing its tension.

Simple yet effective means is provided for turning the adjusting disc 72 to preset the governor for selected control speeds. As shown in Figs. 8–11, the disc turning means or regulator comprises a cylindrically shaped head 80 having a centrally disposed axially projecting square shank 81. This shank is adapted to project through a complementally shaped aperture 82 in the disc 72 so that the latter is constrained to rotate with the regulator. Upon assembly with the carrier 40, the head 80 engages the rim around its open end and is clamped thereto by a nut 83 threaded on the carrier. A gasket 84 is desirably interposed between the regulator head and the carrier to prevent leakage of the liquid from the carrier.

Adjustment of the governor may be made at any time by relieving the nut 83 and turning the regulator on its axis. To facilitate such turning, the outer face of the head 80 is recessed as at 85 for engagement by a spanner wrench. As shown in Fig. 1 the peripheral surface of the nut 83 may be knurled for convenient gripping.

Provision is also made for defining an adjustable limit position for the weight or piston 65 when the governor is at rest. For this purpose the head and shank of the regulator are formed with a through bore internally threaded for the reception of a headless set screw 86. The set screw is adapted to project beyond the end of the shank 81 for engagement by the head of the bolt 70 which secures the spring 66 to the piston 65 and it thus constitutes a limit stop for the piston. The opposite end of the set screw is slotted as at 87 for engagement by a screwdriver or similar tool for screwing it in or out as required. To prevent entry of foreign material into the bore during operation of the governor and to provide an additional seal against leakage, the outer end of the bore may be conveniently closed by a screw 88.

While the mode of operation of the improved governor will be readily apparent from the foregoing, a brief description with reference to the diagram in Fig. 12 will be helpful. In this figure, the magnitude of the forces acting on the carrier 40 and transmitted through it to the brake element 21 are indicated by showing in exaggerated degree the carrier displaced proportionate amounts from a neutral or balanced position. It is to be particularly understood that this is not intended to imply that the carrier ever assumes such positions as its movements are practically negligible, being restrained by its coupling to the brake element 21.

In position A of the diagram, the speed responsive means of the governor is shown at rest. Pressure of the liquid at opposite sides of the weight 65 is the same as indicated by the "O" symbols in the drawing. Accordingly, the weight 65 exerts no force on the carrier 40 so that the brake mechanism is released and substantially no drag is imposed on the motor shaft at the moment of starting.

When the motor comes up to the set steady state control speed as indicated at position B of the diagram, the centrifugal force acting on the weight 65 displaces it a given amount from the axis of rotation to balance the opposing force of the spring 66. There is no pressure differential between the ends of the cylinder as indicated by the "O's" in the drawing. The opposing force of the spring is transmitted through the carrier 40 to the brake mechanism, the brake element 21 being pressed against the element 22 and to apply a frictional drag to the rotation of the motor shaft. With no load on the motor, a heavy drag on the shaft is required to hold the motor at control speed.

Position C of the diagram shows the reaction of the governor upon application of a load to the motor while running at control speed. Upon application of the load, the motor tends to slow down and consequently the centrifugal force acting on the weight 65 is correspondingly reduced. The force exerted by the spring 66 on the weight accordingly tends to shift the weight suddenly toward the spring end of the cylinder and the pressure of the fluid at that end of the cylinder is accordingly increased as indicated by the "+" sign. Pressure at the other end of the cylinder is correspondingly decreased as indicated by the "−" sign. The force is thus transmitted through the column of trapped liquid to the carrier 40 and through it to the brake mechanism to relieve the brake pressure and thus reduce the drag on the motor shaft to a minimum. The motor, of course, quickly brings the shaft up to speed. As this speedup proceeds, the governor is reset for isochronous operation, that is, the weight 65 and carrier 40 move relative to one another to a position of equilibrium as the pressure at opposite ends of the cylinder equalizes. The resetting is effected gradually until the weight and carrier occupy the position indicated at D in the drawing. In this position only a light drag is imposed on the motor by the brake mechanism or, in other words, just sufficient drag to aid the load in maintaining the motor at the set speed.

When the load on the motor is suddenly dropped, the motor tends to speed up and increase the centrifugal force acting on the weight 65. This increase in force results in increasing the pressure at the outer end of the cylinder 67 as indicated by the "+" symbol and reducing the pressure at the opposite end as indicated by the "−" symbol in position E of the drawing. Accordingly, the carrier exerts a force through the spring arms 55 to apply the maximum frictional drag on the shaft and thus slow down the motor to control speed. The weight 65 then gradually returns to equilibrium position with pressure of the liquid equalized at both sides of the weight as shown at F in the drawing.

It will be evident from the foregoing that the improved governor is effective to maintain the motor speed substantially constant under widely varying power and load conditions. The dashpot effect obtained by placing the speed responsive weight in a liquid filled cylinder eliminates hunting and provides quick and sensitive response to speed changes together with automatic resetting of the speed responsive means for isochronous operation.

We claim as our invention:

1. A governor for a rotatably driven shaft comprising, in combination, a carrier adapted to be operatively connected to and rotatable with the shaft, a weight supported in said carrier in offset relation to the axis of rotation of the shaft and carrier, a spring anchored to said carrier and to said weight operative to oppose movement of the weight by the centrifugal force developed by such rotation, friction brake means connected with said carrier operative when a predetermined force is applied to the carrier through said spring for imposing a frictional drag on the rotation of the shaft effective to maintain it at a predetermined control speed, and means including a confined liquid connection between the weight and the carrier operable instantaneously upon a sudden change in shaft speed from the control speed for transmitting the reactive force of said weight through said carrier to said brake means so as to change the frictional drag as required to reestablish control speed.

2. A governor for use with a rotatably driven shaft comprising, in combination, a support structure adapted to be mounted on and to rotate with said shaft, a stationarily supported friction element, a member mounted on said structure for bodily displacement from a normal position in a direction transverse to the axis of the shaft and operative when so displaced to engage said friction element to apply a frictional drag against the rotation of the shaft, means responsive to the speed of the shaft for displacing said member from normal position including a weight rotatable with the structure in a path such that centrifugal force tends to move it outwardly from the axis of rotation, a spring connected between said member and said weight operative to oppose such movement of the weight and to determine the position of the weight for any given speed of the shaft, and non-resilient means interposed between said weight and said member operative upon a sudden change in the speed of the shaft for transmitting to said member a force corresponding to that tending to change the position of said weight.

3. In a governor, in combination, a support structure adapted to be mounted on and to rotate with a rotatably driven shaft, speed responsive means mounted on and rotatable with said structure including, a first member supported for movement transversely of the axis of rotation in response to the centrifugal force generated by rotation with the structure, a second member supported for movement independently of and in a path parallel to the path of movement of said first member in response to the centrifugal force generated by rotation with the structure, spring means interposed between said members yieldably resisting relative movement of the members, a fluid coupling additionally connecting said members for movement as a unit upon abrupt changes in the rotative speed of the structure, said fluid coupling permitting a gradual repositioning of the members under the force exerted by said spring means when the rotative speed of the structure reaches a predetermined set value.

4. The combination with a rotatably driven shaft, of a support structure mounted on and rotatable with said shaft, a carrier mounted on said structure for rotation with it and for movement transversely of its axis of rotation, a weight supported for rotation with said carrier and for movement parallel to the path of movement of the carrier, spring means interposed between said carrier and said weight opposing movement of the weight relative to the carrier, brake means including a stationary element and an element on said structure actuated by the movements of said carrier for imposing a variable frictional drag on the rotation of said structure and said shaft, and coupling means connecting said carrier and weight constraining them to move as a unit upon sudden changes in the rotative speed of the structure to exert a force on said brake while leaving the weight free to move relative to the carrier under steady state speed conditions.

5. Speed responsive means for a centrifugal governor comprising, in combination, means defining a cylinder, means supporting said cylinder for longitudinal movement and for rotation about an axis normal to its longitudinal axis, a viscous liquid filling said cylinder, a piston reciprocable in said cylinder, a spring connected between said piston and one end of the cylinder opposing movement of the piston by centrifugal force upon rotation of the cylinder and effective to determine the position of the piston in the cylinder for any given rotative speed, the ends of said cylinder being connected by a passage permitting displacement of liquid from one end of the cylinder to the other upon movement of the piston, said passage restricting liquid displacement sufficiently to enable the trapped liquid to function as a non-resilient connection between the piston and the cylinder effective to impart longitudinal movements to the cylinder upon sudden changes in the rotative speed of the cylinder.

6. Speed responsive means for a centrifugal governor comprising, in combination, means defining a cylinder, means supporting said cylinder for longitudinal movement and for rotation about an axis normal to its longitudinal axis, a heavy piston reciprocable in said cylinder, a spring connected between said piston and one end of the cylinder opposing movement of the piston by the centrifugal force developed by rotation of the cylinder, and a viscous liquid filling said cylinder operative to instantaneously transmit force from the piston to shift the cylinder longitudinally upon a sudden change in the centrifugal force acting on said piston, said piston having a clearance with the cylinder to permit equalization of the pressure at opposite ends thereof at a predetermined rate.

7. Speed responsive means for a centrifugal governor comprising, in combination, means defining a cylinder, means supporting said cylinder for longitudinal movement and for rotation about an axis normal to its longitudinal axis, a heavy piston reciprocable in said cylinder, a spring connected between said piston and one end of the cylinder opposing movement of the piston by the centrifugal force developed by rotation of the cylinder, and a viscous liquid filling said cylinder operative to constrain the piston and cylinder to react as a unit and shift the cylinder longitudinally upon a sudden change in the centrifugal force acting on said piston, said piston having a clearance with the cylinder permitting gradual resetting of the piston and cylinder to an equilibrium position as the centrifugal force acting on the piston approaches a steady state condition.

8. Speed responsive means for a centrifugal governor comprising, in combination, means defining a cylinder, means supporting said cylinder for longitudinal movement and for rotation about an axis normal to its longitudinal axis, a heavy piston reciprocable in said cylinder, a spring connected between said piston and one end of the cylinder opposing movement of the piston by the centrifugal force developed by rotation of the cylinder, and a viscous liquid filling said cylinder operative to constrain the piston and cylinder to react as a unit and shift the cylinder longitudinally upon a sudden change in the centrifugal force acting on said piston, said piston having a clearance with the cylinder permitting gradual transfer of liquid from one end of the cylinder to the other with movement of the piston relative to the cylinder under steady state speed conditions.

9. In an isochronous governor, in combination, a base adapted to be mounted on a rotatably driven shaft, a stationary support, brake mechanism including an element rotatable with said shaft and an element carried by said support operative to apply a frictional drag on the rotating shaft, speed responsive means including a relatively movable cylinder and piston assembly, a pair of springs supporting said assembly on said base for movement transversely of the rotational axis of the shaft, and spring means operatively connecting said assembly with the rotatable element of said brake mechanism, said assembly responding to the rotative speed of said base to vary the drag applied by said brake as required to maintain a preselected rotative speed under varying load conditions.

10. A governor for an electric motor comprising, in combination, a member rotatable with the motor shaft and movable transversely of the axis of the shaft, brake means operable by said member in its movements to apply a frictional drag against the rotation of the shaft, means responsive to the rotative speed of the shaft for variably positioning said member including a weight rotatable with the member in a path such that centrifugal force tends to shift it outwardly from the axis of the shaft, a spring connected between said member and said weight opposing outward movement of the weight and operative to determine the position of the weight relative to the member for any given shaft speed, and coupling means interposed between said weight and said member operable independently of said spring for transmitting force from said weight to said member in response to a sudden variation in shaft speed due to a change in the voltage or the current supplied to the motor.

11. In a centrifugal governor, in combination, a member defining a cylinder internally screw threaded adjacent one end, a piston reciprocable in said cylinder, a helically coiled spring anchored at one end to said piston, means for anchoring the other end of said spring to the cylinder comprising a disc extending through adjacent turns of the spring and engaging the screw thread in said cylinder, and means for turning said disc to shift it along the cylinder and spring simultaneously whereby to vary the effective length of the spring.

12. In a centrifugal governor, in combination, a member defining a cylinder internally screw threaded adjacent one end, a piston reciprocable in said cylinder, a helically coiled spring anchored at one end to said piston, means for anchoring the other end of said spring to the cylinder comprising a disc extending through adjacent turns of the spring and engaging the screw thread in said cylinder, a regulator comprising a head supported in sealing relation to said one end of the cylinder, a non-circular shank extending from said head axially into the cylinder, said disc having a complementally shaped opening for the reception of said shank whereby rotation of the regulator is effective to screw the disc along the cylinder and spring simultaneously to vary the effective length of the spring.

13. A governor for a rotatably driven shaft comprising, in combination, speed regulating means, a weight, means supporting said weight to revolve about the axis of the shaft incident to rotation of the shaft, said weight being disposed in offset relation to the shaft axis so as to be urged transversely of the shaft by centrifugal force, said supporting means including a carrier on said supporting means, a spring anchored to said carrier and to said weight operative to oppose movement of the weight by centrifugal force, said carrier being operative when a predetermined force is applied thereto through said spring to adjust said speed regulating means to maintain the shaft at a selective rotative speed, and means including a confined body of liquid interposed between said weight and said carrier operable instantaneously upon a sudden change in shaft speed from the selected speed for transmitting the reactive force of said weight to said carrier to readjust said speed regulating means as required to reestablish the selected speed.

14. In a governor for a rotatably driven shaft, in combination, a brake mechanism including a stationarily mounted element and an element adapted to be mounted on the shaft for movement relative to the stationary element to impose a variable friction drag on the rotation of the shaft, a carrier adapted to be mounted on and rotatable with the shaft, said carrier being movable transversely of the axis of the shaft, a weight supported by said carrier for movement transversely of the axis of the shaft by centrifugal force, a spring acting between said carrier and said weight to oppose such transverse movement of the weight, means interposed between said carrier and one of said brake elements operative when the carrier is moved by reaction forces transmitted by said spring to shift said one element so as to maintain the drag on the shaft substantially constant when the shaft and weight are rotating at a predetermined set speed, and other means interposed between said weight and said carrier operable substantially instantaneously upon a change in the load on the shaft to move said carrier and thereby shift said one brake element to alter the drag on said shaft in a direction to reestablish the set speed.

15. A governor for a rotatably driven shaft comprising, in combination, a support structure adapted to be mounted on the shaft to rotate with it, a carrier and a weight supported for rotation with said structure and for movement transverely of the axis of rotation, said weight being disposed in offset relation to the axis of rotation, a spring connected between said carrier and said weight operative to impart movement to the carrier from the weight in response to the centrifugal force developed by rotation of the weight, brake means including relatively movable elements, a linkage interposed between said carrier and one of said elements actuated by said carrier when a predetermined force is applied thereto through said spring for shifting said one brake element to impose a frictional drag on the rotation of the shaft effective to maintain it at a predetermined control speed, and coupling means interposed between said weight and said carrier operable independently of said spring on a sudden decrease in the load on the shaft and consequent increase in speed for instantaneously transmitting a force from said weight to said carrier effective through said linkage to increase the frictional drag to the extent necessary to reestablish control speed.

16. In a governor for a rotatably driven shaft, in combination, means adjustable to control the speed of the shaft, a carrier mounted on said shaft for rotation with it and for limited movement transversely of the shaft axis, a linkage connecting said carrier with said adjustable control means, a weight mounted on said carrier to revolve about the axis of the shaft and to move in a path transverse to the shaft axis under the influence of centrifugal force, a spring interposed between said carrier and said weight opposing movement of the weight in said transverse path, said weight acting through said spring to move said carrier transversely, for adjusting said control means for maintaining the shaft speed substantially constant when the shaft is rotating and the weight revolving at a selected speed, and other means interposed between the weight and said carrier operable substantially instantaneously upon a change in the load on the shaft for shifting said carrier to adjust the control means in a direction to reestablish the selected speed.

17. The combination with a rotatably driven shaft, of brake mechanism including a stationarily supported brake element, a movable brake element, means supporting said movable brake element for rotation with said shaft and for movement into and out of frictional engagement with said stationary element, a carrier mounted on said supporting means for movement transversely of the axis of rotation, a weight mounted on said carrier for rotation with the shaft and for movement transversely of the shaft by centrifugal force, a spring acting between said carrier and said weight opposing movement of the weight, said weight acting through said spring to impart movement to said carrier, a linkage connecting said carrier with said movable element operative to urge it against said stationary element with a substantially constant pressure when the shaft and weight are rotating at a predetermined set speed, and other means coupling said weight with said carrier independently of said spring operable upon a change in the load on said shaft for substantially instantaneously moving the carrier to vary the pressure of said movable element on the stationary element in a direction to reestablish the set speed of the shaft.

References Cited in the file of this patent
UNITED STATES PATENTS

| | | |
|---|---|---|
| 666,237 | Riotte | Jan. 15, 1901 |
| 2,685,932 | Hartel | Aug. 10, 1954 |
| 2,805,738 | Baxter | Sept. 10, 1957 |

UNITED STATES PATENT OFFICE

CERTIFICATION OF CORRECTION

Patent No. 2,954,852　　　　　　　　　　　　October 4, 1960

Leo Kull et al.

It is hereby certified that error appears in the above numbered patent requiring correction and that the said Letters Patent should read as corrected below.

In the grant, line 1, and in the heading to the printed specification, line 4, name of first inventor, for "Lee Kull", each occurrence, read -- Leo Kull --.

Signed and sealed this 2nd day of May 1961.

(SEAL)
Attest:

ERNEST W. SWIDER
Attesting Officer

DAVID L. LADD
Commissioner of Patents